US009165485B2

(12) United States Patent
Choi et al.

(10) Patent No.: US 9,165,485 B2
(45) Date of Patent: Oct. 20, 2015

(54) DISPLAY APPARATUS

(75) Inventors: Minsung Choi, Cheonan-si (KR); Minsoo Kang, Busan (KR); Moonju Kim, Busan (KR); Miju Kim, Ulsan (KR); Yuntae Kim, Incheon (KR); Soo-Ran Park, Asan-si (KR); Sangchul Lee, Yongin-si (KR); Yong-Ju Jeong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 325 days.

(21) Appl. No.: 13/611,996

(22) Filed: Sep. 12, 2012

(65) Prior Publication Data
US 2013/0222730 A1  Aug. 29, 2013

(30) Foreign Application Priority Data

Feb. 27, 2012 (KR) .......................... 10-2012-0019808

(51) Int. Cl.
*G02F 1/1335* (2006.01)
*G09F 13/04* (2006.01)
*G02F 1/1333* (2006.01)
*F21V 8/00* (2006.01)
*G06F 1/16* (2006.01)
*H04M 1/02* (2006.01)
*H04M 1/22* (2006.01)
*G06F 1/32* (2006.01)

(52) U.S. Cl.
CPC .......... *G09F 13/04* (2013.01); *G02F 1/133371* (2013.01); *H04M 1/0266* (2013.01); *G02B 6/0055* (2013.01); *G02B 6/0088* (2013.01); *G02F 1/133555* (2013.01); *G02F 2001/133627* (2013.01); *G02F 2201/44* (2013.01); *G02F 2201/58* (2013.01); *G02F 2203/09* (2013.01); *G06F 1/1616* (2013.01); *G06F 1/1622* (2013.01); *G06F 1/1624* (2013.01); *G06F 1/3265* (2013.01); *H04M 1/0214* (2013.01); *H04M 1/0225* (2013.01); *H04M 1/0235* (2013.01); *H04M 1/22* (2013.01); *H04M 2250/16* (2013.01); *Y02B 60/1242* (2013.01)

(58) Field of Classification Search
CPC ..................... G02F 1/133555; G02F 1/133371
See application file for complete search history.

(56) References Cited

U.S. PATENT DOCUMENTS

| 5,574,477 | A | 11/1996 | Shimizu et al. |
| 5,777,704 | A | 7/1998 | Selker |
| 6,839,101 | B2 | 1/2005 | Shima |
| 2002/0158999 | A1* | 10/2002 | Shima .............................. 349/58 |
| 2006/0044286 | A1 | 3/2006 | Kohlhaas et al. |
| 2013/0053100 | A1* | 2/2013 | Song et al. ................. 455/556.1 |

FOREIGN PATENT DOCUMENTS

| JP | 06043743 | 2/1994 |
| JP | 06208116 | 7/1994 |

(Continued)

*Primary Examiner* — Phu Vu
(74) *Attorney, Agent, or Firm* — H.C. Park & Associates, PLC

(57) ABSTRACT

A display apparatus includes a backlight part including a backlight unit and a panel part including a display panel. The panel part is operated in a first state in which the display panel is substantially aligned with the backlight part or in a second state in which the display panel is not substantially aligned with the backlight part. The display panel receives the light from the backlight unit in the first state and receives an external light in the second state.

22 Claims, 5 Drawing Sheets

(56) References Cited

FOREIGN PATENT DOCUMENTS

| | | |
|---|---|---|
| JP | 07160418 | 6/1995 |
| JP | 2004325658 | 11/2004 |
| JP | 2005070668 | 3/2005 |
| KR | 1020040025474 | 3/2004 |
| KR | 1020060024679 | 3/2006 |
| KR | 1020060028297 | 3/2006 |

* cited by examiner

DISPLAY APPARATUS

CROSS-REFERENCE TO RELATED APPLICATION

This U.S. non-provisional patent application claims priority from and the benefit of Korean Patent Application No. 10-2012-0019808, filed on Feb. 27, 2012, which is incorporated by reference for all purposes as if fully set forth herein.

BACKGROUND

1. Field

The following description relates to a display apparatus. More particularly, the present disclosure relates to a display apparatus to be operated in either transparent or non-transparent mode.

2. Discussion of the Background

Generally, a non-self-emissive display apparatus uses a separate light source, is which is different from a self-emissive display apparatus, e.g., an organic electroluminescent display apparatus, a plasma display apparatus. If anon-self-emissive display apparatus is used outdoors where the luminous intensity may be relatively high, there may be a reduction in the visibility of the non-self-emissive display apparatus due to reflection of external light even if brightness of the non-self-emissive display apparatus is set relatively high.

A transparent display apparatus has been developed which is able to show an object disposed in the rear thereof while displaying an image. The transparent display apparatus utilizes external light. The visibility of the transparent display apparatus may be degraded in an environment where aluminous intensity is relatively low.

SUMMARY

Exemplary embodiments of the present invention provide a display apparatus configured to provide sufficient visibility regardless of surrounding luminous intensity and to reduce power consumption.

Additional features of the invention will be set forth in the description which follows, and in part will be apparent from the description, or may be learned by practice of the invention.

An exemplary embodiment of the present invention discloses a display apparatus, including: a backlight part including a backlight unit configured to receive a light control signal and to control a light source in response to the light control signal; and a panel part including a display panel configured to display an image in a first state using light received from the backlight part and to display an image in a second state using externally received light.

An exemplary embodiment of the present invention also discloses a display apparatus, including: a light source configured to emit light; a display panel configured to display an image; and a coupler configured to couple the light source and the display panel together, wherein, in a first coupling state, the display panel displays a first image based on light received from the light source, and wherein in a second coupling state, the display panel displays a second image based on received external light.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
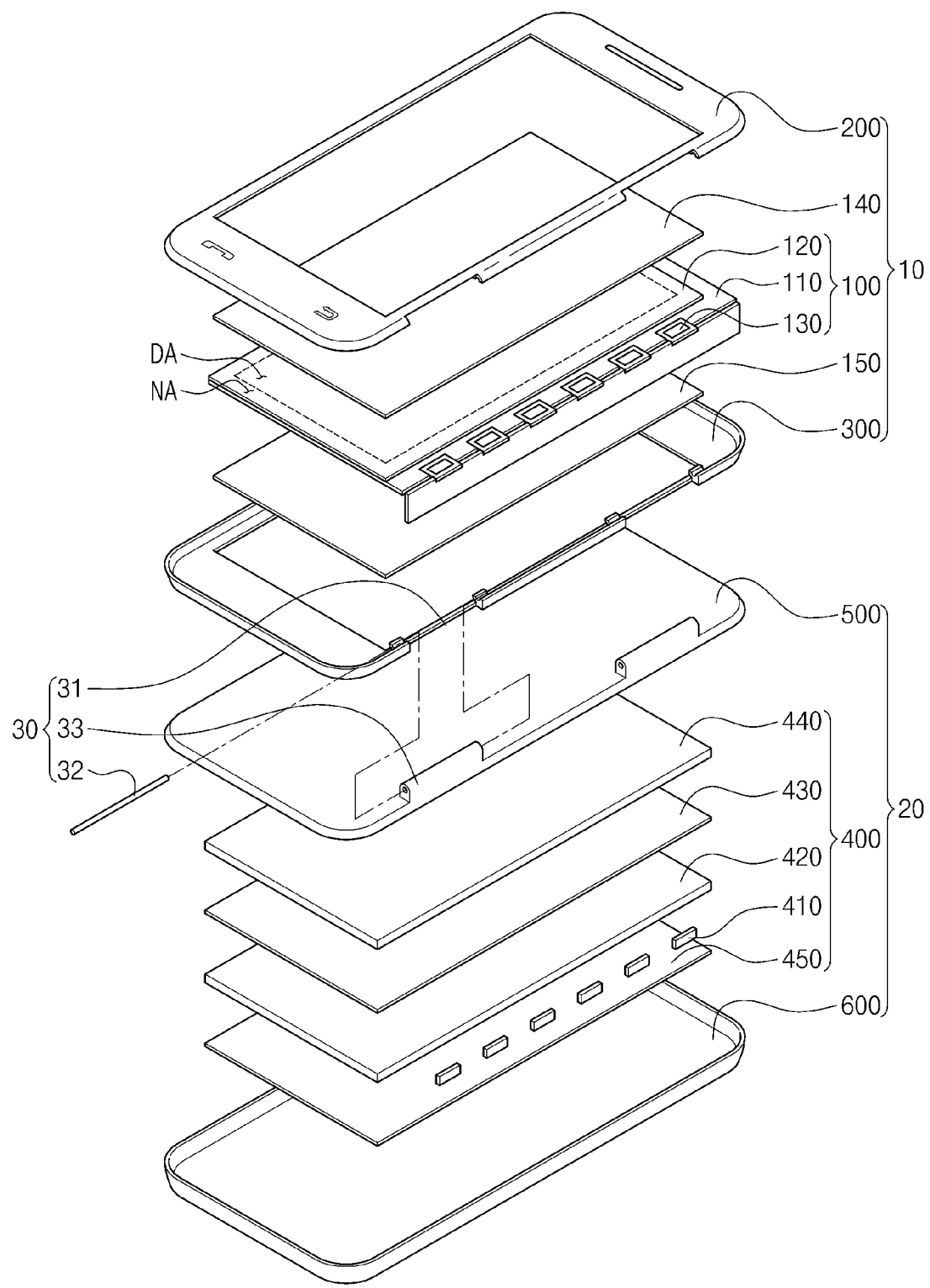
FIG. 1 is an exploded perspective view of a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of elements, components, regions, layers, or sections may be exaggerated for clarity. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a,", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display apparatus may be any of various electric devices, such as a mobile phone, a digital camera, a television set, a personal digital assistant (PDA), a portable media player (PMP), etc. Hereinafter, exemplary embodiments of the present invention will be described in relation to a mobile phone.

FIG. 1 is an exploded perspective view of a of a display apparatus according to an exemplary embodiment of the present invention.

Referring to FIG. 1, the display apparatus includes a panel part 10 and a backlight part 20.

The panel part 10 includes a display panel 100, an upper panel cover 200, and a lower cover panel 300.

The display panel 100 may not be a self-emissive panel. The display panel 100 may be various display panels, such as a liquid crystal display panel, and electrophoretic display panel, an electro-wetting display panel, etc., which use a separate light source. Hereinafter, exemplary embodiments of the present invention will be described in relation to a liquid crystal display panel as the display panel 100.

The display panel 100 includes a display area DA in which an image is displayed and a non-display area NA adjacent to at least a portion of the display area DA.

The display panel 100 includes a first substrate 110, a second substrate 120 facing the first substrate 110, and a liquid crystal layer (not shown) disposed between the first substrate 110 and the second substrate 120.

Although not shown in FIG. 1, the first substrate 110 may include gate lines, data lines crossing the gate lines, and pixel electrodes. The first substrate 110 includes a plurality of pixel areas arranged in a matrix form, and a plurality of pixels may be arranged in the pixel areas. Each pixel may include a thin film transistor, a liquid crystal capacitor, and a storage capacitor. The thin film transistor may be connected to a corresponding gate line of the gate lines and a corresponding data line of the data lines to apply a data voltage to a corresponding pixel electrode of the pixel electrodes in response to a gate-on signal.

Although not shown in FIG. 1, the second substrate 120 may include a common electrode formed thereon and the common electrode may be applied with a reference voltage.

The liquid crystal layer disposed between the pixel electrode and the common electrode may serve as a dielectric substance. The liquid crystal capacitor may be charged with a voltage corresponding to an electric potential difference between the data voltage and the reference voltage. The second substrate 120 may include a color filter layer.

In addition, a driving circuit 130 may be disposed adjacent to a side of the first substrate 110. The driving circuit 130 may receive a data signal and a control signal from an external device (not shown) and drive the display panel 100 in response to the control signal.

At least a portion of the display panel 100 may be transparent or semi-transparent. For example, at least the display area DA may be transparent or semi-transparent. If the display panel 100 is separated from the backlight unit 20, a viewer may perceive an object disposed behind the display panel 100 through the display area DA.

A polarizing plate may be disposed on at least one of an upper surface and a lower surface of the display panel 100. For example, as shown in FIG. 1, the display apparatus may include a first polarizing plate 140 disposed on the upper surface of the display panel 100 and a second polarizing plate 150 disposed on the lower surface of the display panel 100.

The first polarizing plate 140 may be disposed such that its transmission axis may be substantially perpendicular to a transmission axis of the second polarizing plate 150. The first polarizing plate 140 and the second polarizing plate 150 may have a haze value of zero (0), and may be substantially transparent. Light incident to the first polarizing plate 140 and the second polarizing plate 150 may not be reflected by the first polarizing plate 140 and second polarizing plate 150. Thus, although the display panel 100 includes the first polarizing plate 140 and second polarizing plate 150, the first polarizing plate 140 and second polarizing plate 150 may not impact the transparency of the display panel 100.

The upper panel cover 200 and the lower panel cover 300 may be coupled to each other with the display panel 100 interposed there between. The display panel 100 may be configured to be accommodated in a space between the upper panel cover 200 and the lower panel cover 300. The upper panel cover 200 and the lower panel cover 300 may be disposed along an edge of the display panel 100 and may have various shapes, e.g., a rectangular ring shape. The upper panel cover 200 and the lower panel cover 300 are provided with a hinge recess 31 on a side thereof. In FIG. 1, two hinge recesses 31 have been shown, but the number of the hinge recesses 31 is not limited thereto. The upper panel cover 200 and the lower panel cover 300 may be configured to be separated from each other, but are not limited thereto. That is, the upper panel cover 200 and the lower panel cover 300 may be integrally formed with each other.

The display panel 100 may be protected from external impacts by the upper panel cover 200 and the lower panel cover 300. The display panel 100 may be separated from the backlight unit 20 to be used as an independent module.

The backlight part 20 includes a backlight unit 400, an upper backlight cover 500, and a lower backlight cover 600.

The backlight unit 400 may be disposed under the display panel 100. The backlight unit 400 includes a light source 410, a light guide plate 420, an optical sheet, and a reflective sheet 450.

The light source 410 may provide light to the light guide plate 420. One or more light sources 410 may be used. As shown in FIG. 1, the light source 410 may be disposed adjacent to a side of the light guide plate 420, and the light source 410 may be disposed under the light guide plate 420. The light source 410 may be configured to include a light emitting diode LED or a cold cathode fluorescent lamp (CCFL).

Although not shown in FIG. 1, the light source 410 may receive a light control signal from a controller (not shown) and may provide the light to the light guide plate 420 in response to the light control signal. The light control signal may include an on-signal and an off-signal. The controller may provide the on-signal or the off-signal to the light source 410 according to a moving state of the panel part 10. The light source 410 may provide the light to the light guide plate 420 in response to the on-signal and may turn off the light in response to the off-signal.

The light guide plate 420 may be configured to guide the light provided from the light source 410 and to output at least a portion of the light to the display panel 100. The light guide plate 420 may be disposed to correspond to the display area DA of the display panel 100.

The optical sheet may be configured to control at least a portion of the light exiting from the light guide plate 420. The optical sheet may be disposed between the upper backlight cover 500 and the light guide plate 420. The optical sheet includes a diffusion sheet 430 and a protective sheet 440. In FIG. 1, the optical sheet includes one diffusion sheet 430 and one protective sheet 440 only as an example. That is, more than one diffusion sheet 430 and more than one protective sheet 440 may be used in the optical sheet.

The reflective sheet 450 may be disposed under the light guide plate 420. The reflective sheet 450 is configured to substantially reflect the light from the light guide plate 420 which was not directed to the display panel 100, so that the light from the light guide plate 420 that reaches the reflective sheet may travel to the display panel 100. The reflective sheet 450 may be formed from a material that reflects the light. Consequently, an amount of the light provided to the display panel 100 may be increased by the reflective sheet 450 that is configured to reflect the light leaked from the light guide plate 420.

The upper backlight cover 500 and the lower backlight cover 600 may be coupled to each other with the backlight unit 400 interposed there between. The backlight unit 400 may be configured to be accommodated between the upper backlight cover 500 and the lower backlight cover 600. The upper backlight cover 500 and the lower backlight cover 600 may have a shape corresponding to that of the backlight unit 400. As shown in FIG. 1, the upper backlight cover 500 includes an upper surface corresponding to the shape of the backlight unit 400 and side surfaces which extend downward from the upper surface. The upper backlight cover 500 may include a protrusion 33 disposed on a side of the upper surface of the upper backlight cover 500. The protrusion 33 may be provided with a thru-hole there through. The protrusion 33 may be disposed at a position corresponding to the hinge recess 31. In FIG. 1, two protrusions 33 have been shown, and the number of the protrusions 33 corresponds to the number of the hinge recesses 31, but other variations are possible. For example, there may be one protrusion 33 and to one hinge recess 31, or there may be three or more protrusions 33 and hinge recesses 31. Moreover, the upper backlight cover 500 may be configured to have the hinge recesses with the lower panel cover 300 having the protrusions. The lower backlight cover 600 may include a lower surface corresponding to the shape of the backlight unit 400 and side surfaces that extend upward from the lower surface. The upper backlight cover 500 and the lower backlight cover 600 may be configured to be separated from each other as shown in FIG. 1. Alternatively, the upper backlight cover 500 and lower backlight cover 600 may be integrally formed with each other.

The backlight unit 400 may be protected from external impacts by the upper backlight cover 500 and the lower backlight cover 600. The backlight unit 400 maybe separated from the panel part 10 to be used as an independent module.

The display apparatus may further include a hinge pin 32. The hinge pin 32 may connect the panel part 10 and the backlight part 20. The hinge pin 32 may be inserted into the thru-hole of the protrusion 33 and a side of the hinge recess 31.

Hereinafter, the hinge recess 31, the protrusion 33, and the hinge pin 32 are referred to as a hinge 30.

The panel part 10 and the backlight part 20 may be folded or held together by the hinge 30. The position at which the hinge 30 is disposed not limited to a specific position as long as aside of the panel part 10 is hinge-coupled to aside of the backlight part 20. Although, two hinges 30 have been shown in FIG. 1, as indicated above, the number and configuration of the hinges may vary.

The panel part 10 may be moved from a first state to a second state, or vice versa, for example, by rotating the panel part 10 around hinge 30. The display apparatus may be operated in the first state or the second state. In the first state or "closed" state, the panel part 10 and the backlight part 20 may be substantially aligned with each other. In the first state, the display panel 100 is configured to receive light from the backlight unit 400 to display an image. In the second state or "open" state, the panel part 10 is not substantially aligned with the backlight part 20. The display panel 100 is configured to receive external light during the second state to display the image. Hereinafter "external light" refers to light not originating from the light source 450.

Figure 2:
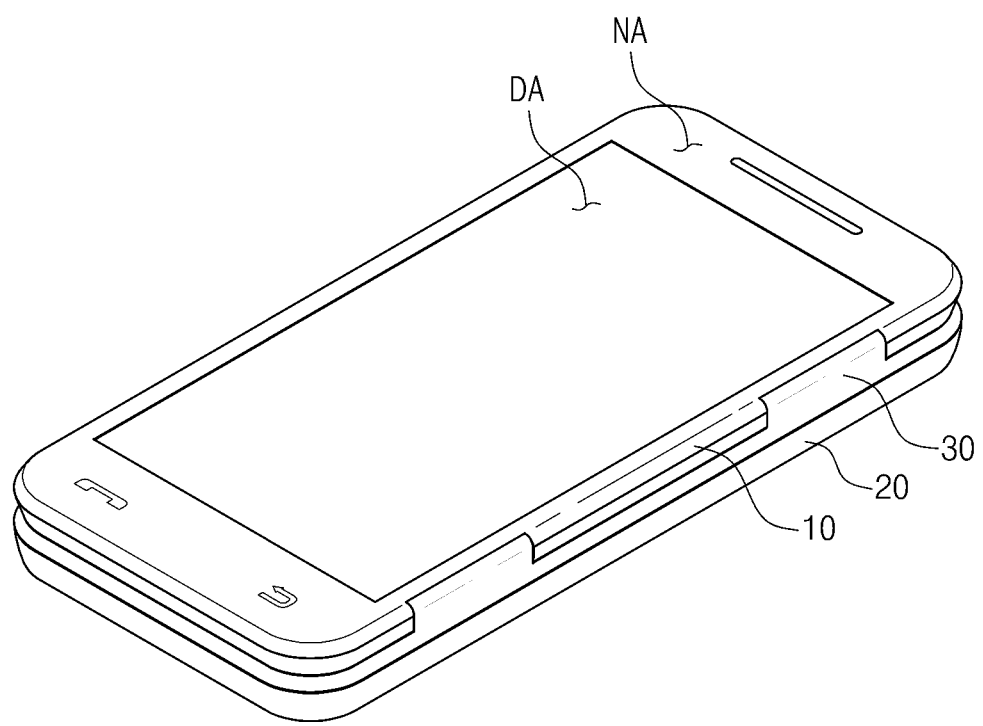
FIG. 2 is a perspective view of a display apparatus according to an exemplary embodiment of the present invention.

FIG. 2 is a perspective view of a display apparatus according to an exemplary embodiment of the present invention.

FIG. 2 depicts the display apparatus in the first state. Referring to FIG. 1 and FIG. 2, the panel part 10 may be operated while substantially aligned with the backlight part 20. The display area DA of the display panel 100 is disposed to correspond to the backlight unit 400 in the first state. The display panel 100 is configured to display an image using the light emitted from the backlight unit 400, which travels to the display panel 100.

The display apparatus is in anon-transparent mode while in the first state. Thus, a viewer may not perceive objects disposed behind the display apparatus while the display apparatus is in the first state.

The display apparatus operated in the first state may be used in environments where the luminous intensity is relatively low, such as darkroom, indoor place, etc.

Figure 3:
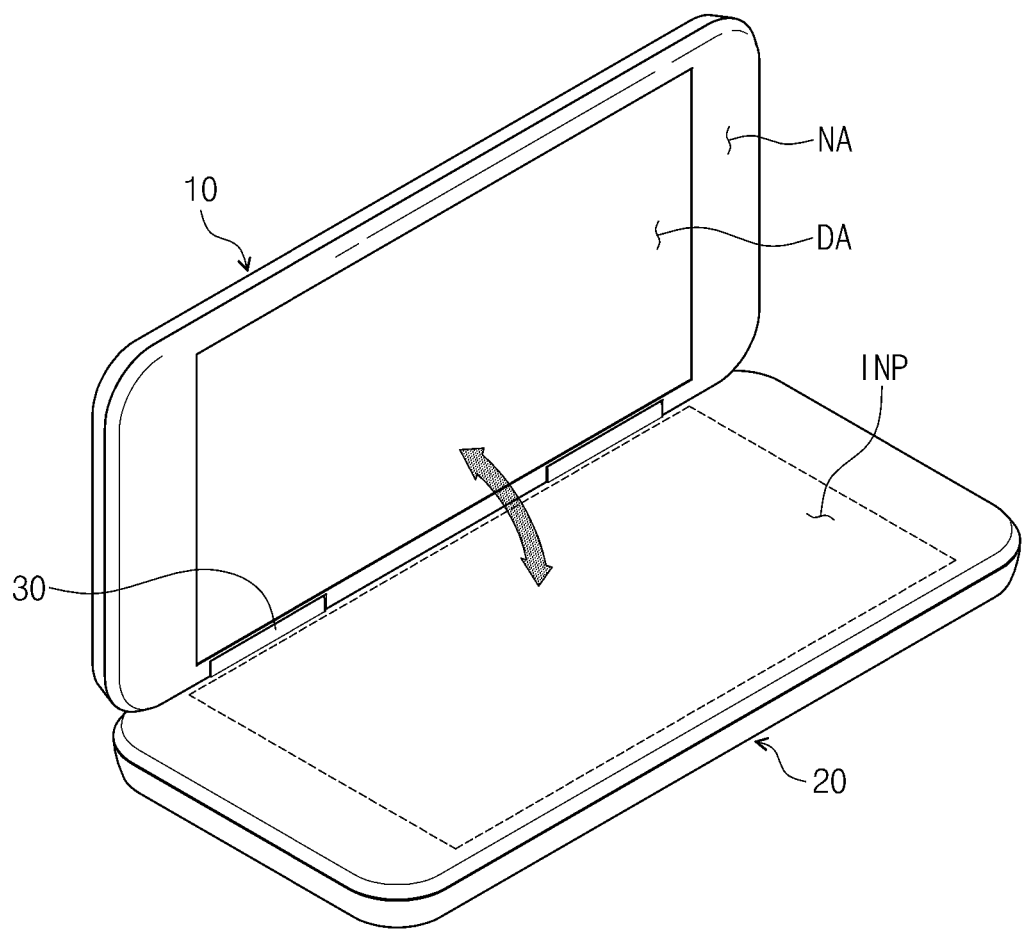
FIG. 3 is a perspective view of a display apparatus according to an exemplary embodiment of the present invention.

FIG. 3 is a perspective view of a display apparatus according to an exemplary embodiment of the present invention.

FIG. 3 depicts the display apparatus in the second state. Referring to FIG. 1, FIG. 2, and FIG. 3, the panel part 10 may be moved from the first state to the second state using the hinge 30. If the panel part 10 is operated in the open state, the display apparatus is operated in the transparent mode. Accordingly, a viewer may perceive an image displayed on the display panel 100 while recognizing an object behind the display apparatus in the second state.

The display panel 100 is configured to display an image using external light in the second state. The display panel 100 is configured to display the image using external light traveling to a surface of the display panel 100 on which the image is displayed from an opposite surface of the display panel 100.

If the external light is incident to both surfaces of the display panel 100, the display panel 100 may display the image on both surfaces of the display panel 100. The display panel 100 displays a first image on the upper surface of the display panel 100 and a second image on the lower surface of the display panel 100. The lower surface of the display panel 100 faces the backlight part 20 in the first state.

The first image and the second image are displayed using the same data voltage but displayed using external light. The external light used to display the first image and the second image may be received from a direction opposite to each surface displaying the first image and the second image. The first image and second image may be symmetrical with each other with respect to a side of the display apparatus about which the panel part 10 moves.

When the panel part 10 is moved to the second state from the first state, the second image may be inverted up and down or left and right. A viewer may perceive the first image through the upper surface of the display panel 100 in the first state. If the panel part 10 is then moved to operate in the second state, the viewer may perceive the second image through the lower surface of the display panel 100. As shown in FIG. 3, if the panel part 10 moves upward from the closed position, and the second image may be inverted up and down with respect to a viewing direction in which the viewer watches the display apparatus.

In addition, although not shown in figures, if the panel part 10 moves to left from right or to right from left with respect to the viewing direction, the second image may be inverted left and right with respect to the viewing direction of the display apparatus.

Accordingly, the viewer may perceive the image in the second state without rotating the display apparatus from a position it was in during the first state.

The backlight unit 400 may be turned off in the second state. When the panel part 10 is moved to the second state from the first state, the controller (not shown) may be configured to apply an off-signal to the light source 410. The light source 410 may be turned off in response to the off-signal.

The controller may include an infrared ray sensor in order to sense movement of the panel part 10 from the first state to the second state. Further, the controller may include a switching device having two terminals disposed on a surface of panel part 10 and a surface of backlight part 20 facing the surface of panel part 10, respectively in order to sense movement of panel part 10 from the first state to the second state. The controller can include various devices sensing the movement of the panel part 10.

The display apparatus may further include an input part INP disposed between the panel part 10 and the backlight part 20. The input part INP may be disposed to correspond to at least a portion of an upper surface of the backlight part 20. The input part INP may be a touch pad, a button-type keypad, etc. The input part INP may be transparent or semi-transparent to allow light from light source 410 to reach the display panel 100.

The input part INP may not be exposed to an exterior environment in the first state but may be exposed to the exterior environment in the second state. A viewer may input data into the display apparatus by using the input part INP in the second state.

In the second state, the display apparatus is configured to display the first image and the second image using external light without receiving light from the backlight unit 400 if the display apparatus is used in an environment where the luminous intensity is relatively high. In this case, the display apparatus is operated in the transparent mode. Thus, the visibility of an image displayed on the display apparatus while operating in the second state may be relatively higher than that of an image displayed on the display apparatus while operating in the first state.

The backlight unit 400 may be turned off if the display apparatus is operated in the second state, which may reduce power consumption in the display apparatus and therefore a battery (not shown) of the display apparatus may have a longer life-span compared with a battery in the conventional display apparatus.

Figure 4:
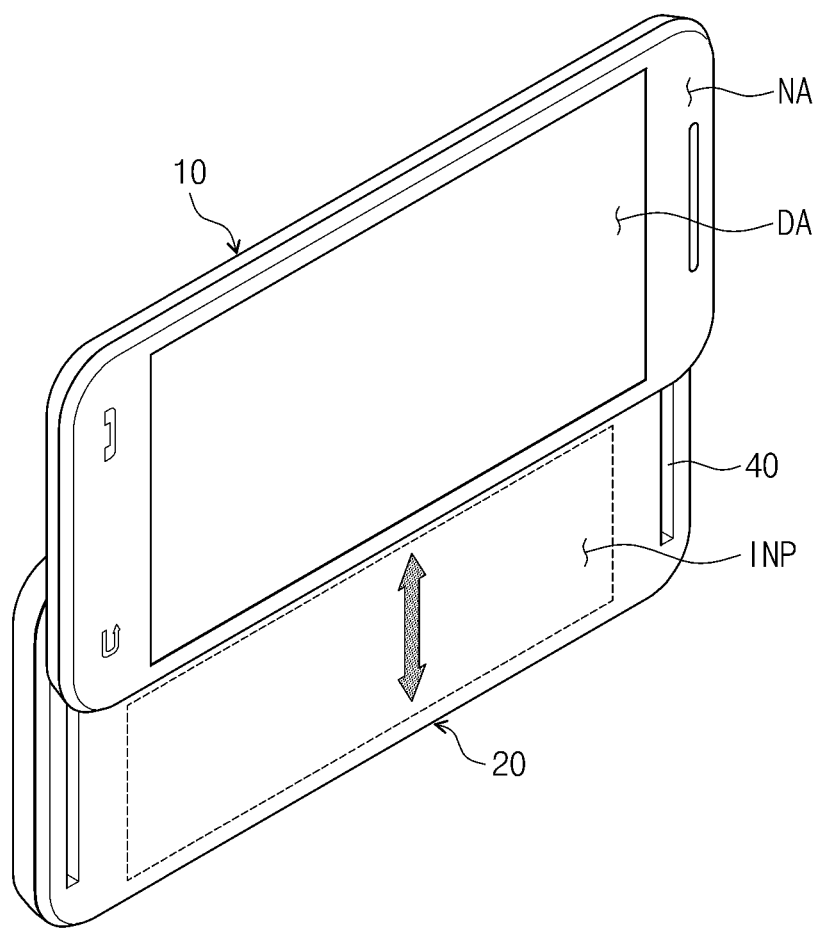
FIG. 4 is a perspective view of a display apparatus according to an exemplary embodiment of the present invention.

FIG. 4 is a perspective view of a display apparatus according to an exemplary embodiment of the present invention.

FIG. 4 depicts the display apparatus in the second state. In FIG. 4, the panel part 10 and the backlight part 20 may have substantially the same structure and operate in substantially the same way as the panel part 10 and the backlight part 20 described with reference to FIG. 1, FIG. 2, and FIG. 3, except that the panel part 10 is configured to move to the second state from the first state by sliding across the backlight part 20. Thus detailed descriptions of the similar elements will be omitted for conciseness.

Referring to FIG. 4, the display apparatus may include a sliding coupling part. The sliding coupling part may include a slider (not shown) and a guide recess 40. The slider may be disposed on a surface of the panel part 10 facing the backlight part 20. The slider may extend along a direction in which the panel part 10 slides and may be disposed at both ends of the display panel 100. The guide recess 40 may be disposed on a surface of the backlight part 20 facing the slider. The guide recess 40 may be disposed to correspond to the slider and may have a shape corresponding to that of the slider.

Although depicted in FIG. 4 to include the slider and the guide recess 40, the sliding coupling part is not limited thereto. That is, the sliding coupling part may be replaced with various other sliding members. The slider may be disposed on backlight part 20 and the guide recess 40 may be disposed on the panel part 10.

The panel part 10 may slide across the backlight part 20 using the sliding coupling part to allow the panel part 10 to be moved to the second state from the first state. When the panel part 10 is operated in the open state after being slid across the backlight part 20, the display apparatus is operated in the transparent mode. Thus, a viewer may perceive an image displayed on the display panel 100 while perceiving an object behind the display apparatus in the second state.

The display panel 100 is configured to display the image using external light in the second state. The display panel 100 is configured to display the image using external light traveling to a surface of the display panel 100 on which the image is displayed from an opposite surface of the display panel 100.

The backlight unit 400 may be turned off in the second state. When the panel part 10 is moved to the second state from the first state, the controller (not shown) may be configured to off-signal to the light source 410. The light source 410 may be turned off in response to the off-signal.

The display apparatus may further include an input part INP disposed between the panel part 10 and the backlight part 20. The input part INP may be disposed to correspond to at least a portion of an upper surface of the backlight part 20. The input part INP may be a touch pad, a button-type keypad, etc.

The input part INP may not be exposed to an exterior environment in the first state but may be exposed to the exterior environment in the second state. A viewer may input data into the display apparatus by using the input part INP in the second state.

In the second state, the display apparatus is configured to display the first image and second image using external light without receiving light from the backlight unit 400 if the display apparatus is used in an environment where the luminous intensity is relatively high. In this case, the display apparatus is operated in the transparent mode. Thus, the visibility of an image displayed on the display apparatus while operating in the second state may be relatively higher than that of an image displayed on the display apparatus while operating in the first state.

The backlight unit 400 may be turned off if the display apparatus is operated in the second state, which may reduce power consumption in the display apparatus and therefore a battery (not shown) of the display apparatus may have a longer life-span compared with a battery in the conventional display apparatus.

Figure 5:
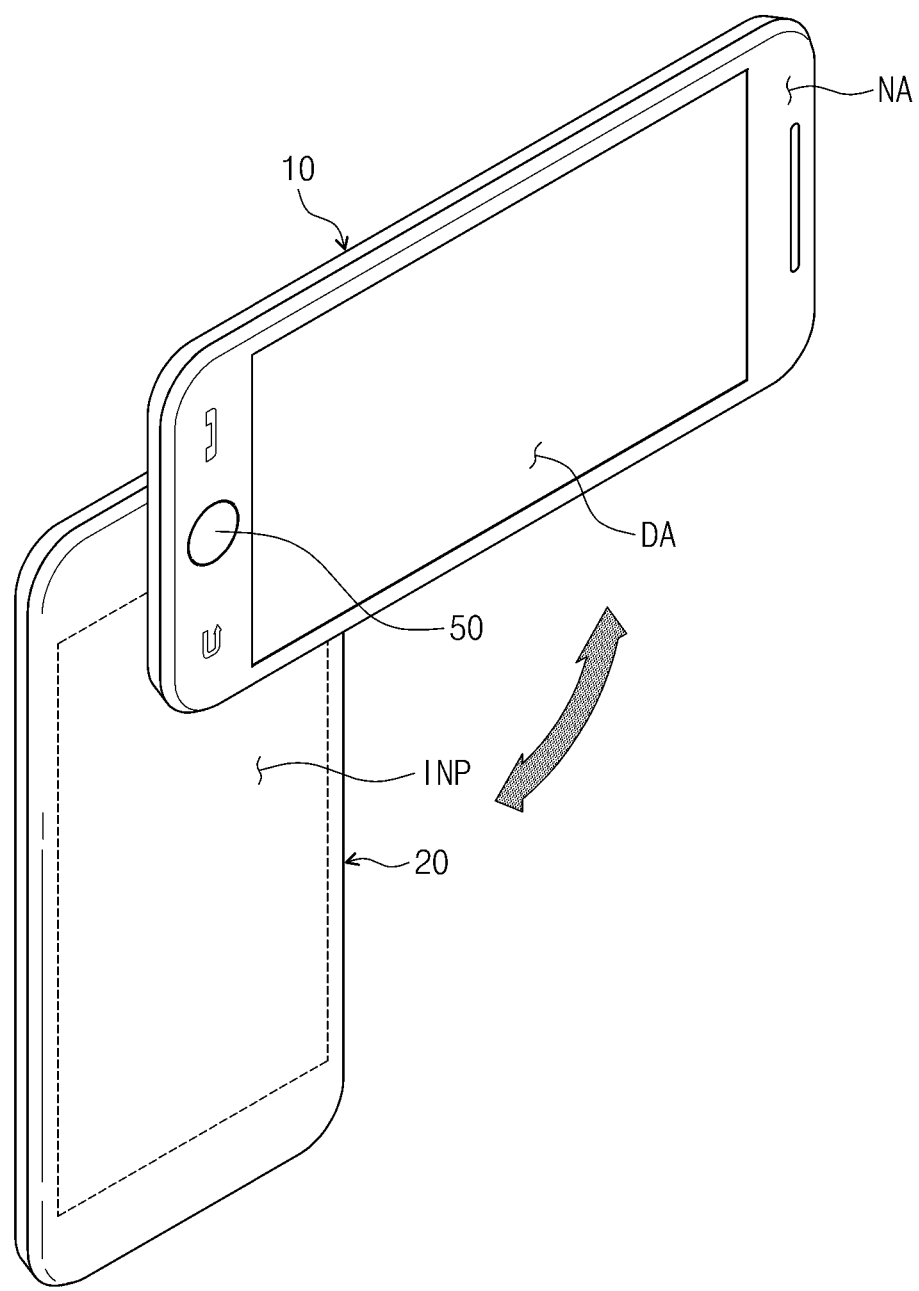
FIG. 5 is a perspective view of a display apparatus according to an exemplary embodiment of the present invention.

FIG. 5 is a perspective view of a display apparatus according to an exemplary embodiment of the present invention.

FIG. 5 depicts the display apparatus in the second state. In FIG. 5, the panel part 10 and the backlight part 20 may have substantially the same structure and operate in substantially the same way as those of the panel part 10 and the backlight part 20 as described with reference to FIG. 1, FIG. 2, FIG. 3, and FIG. 4, except that the panel part 10 is configured to move to the second state from the first state by rotating about an axis. Thus detailed descriptions of the similar elements will be omitted for conciseness.

Referring to FIG. 5, the display apparatus may include a rotational hinge 50. The rotational hinge 50 connects the panel part 10 and the backlight part 20. The rotational hinge 50 may be disposed at any position as long as a side of the panel part 10 is hinge-coupled to a side of the backlight part 20. In FIG. 5, the rotational hinge 50 is disposed at a center of a first side of the panel part 10, which corresponds to a center of a first side of the backlight part 20.

The panel part 10 may be rotated with respect to the backlight part 20 along an axis of the rotational hinge 50, so that the panel part 10 may be moved to the second state from the first state. The panel part 10 may be rotated in a direction substantially parallel to an upper surface of the backlight part 20.

When the panel part 10 is operated in the open state after being rotated with respect to the backlight part 20, the display apparatus is operated in the transparent mode. Thus, a viewer may perceive an image displayed on the display panel 100 while perceiving an object behind the display apparatus in the second state.

When the panel part 10 is moved to the second state from the first state, a first image displayed through the upper surface of the display panel 100 in the first state may be inverted up and down. For example, if the panel part 10 is rotated about 180 degrees from the first state, the first image displayed through the upper surface of the display panel 100 in the first state may be inverted up and down.

Thus, although the panel part 10 is rotated with respect to the backlight part 20, a viewer's perception of the first image, or viewing direction, may not alter in the second state from the first state.

The backlight unit 400 may be turned off in the second state. When the panel part 10 is moved to the second state from the first state, the controller (not shown) may be configured to apply an off-signal to the light source 410. The light source 410 may be turned off in response to the off-signal.

The display apparatus may further include an input part INP disposed between the panel part 10 and the backlight part 20. The input part INP may be disposed to correspond to at least a portion of an upper surface of the backlight part 20. The input part INP may be a touch pad, a button-type keypad, etc.

The input part INP may not be exposed to an exterior environment in the first state but may be exposed to the exterior environment in the second state. A viewer may input data into the display apparatus by using the input part INP in the second state.

In the second state, the display apparatus is configured to display the first image and the second image using external light without receiving light from the backlight unit 400 if the display apparatus is used in an environment where the luminous intensity is relatively high. In this case, the display apparatus is operated in the transparent mode. Thus, the visibility of an image displayed on the display apparatus while operating in the second state may be relatively higher than that of an image displayed on the display apparatus while operating in the first state.

The backlight unit 400 may be turned off if the display apparatus is operated in the second state, which may reduce power consumption in the display apparatus and therefore a battery (not shown) of the display apparatus may have a longer life-span compared with a battery in the conventional display apparatus.

According to the exemplary embodiments, the display apparatus may provide relatively high image visibility regardless of whether surrounding luminous intensity is high or low. In addition, power consumption in the display apparatus may be reduced and a battery life-span extended.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
a backlight part comprising a backlight unit configured to receive a light control signal and to control a light source in response to the light control signal;
a controller to generate the light control signal; and
a panel part comprising a display panel configured to display an image in a first state using light received from the backlight part and to display an image in a second state using externally received light,
wherein:
the light control signal comprises an on-signal and an off-signal, and the controller transmits the on-signal to the backlight unit in response to a determination that the panel part is in the first state, and transmits the off-signal to the backlight unit in response to a determination that the panel part is in the second state, and
the backlight unit emits light in response to the on-signal and is turned off in response to the off-signal.

2. The display apparatus of claim 1, wherein at least a portion of the display panel is transparent or semi-transparent.

3. The display apparatus of claim 1, wherein the display panel is disposed on the backlight part in the first state.

4. The display apparatus of claim 1, wherein the panel part is movable to the second state from the first state and to the first state from the second state.

5. The display apparatus of claim 1, wherein the backlight unit receives the off-signal from the controller when the panel part is moved to the second state from the first state.

6. The display apparatus of claim 1, further comprising a portion to hold the panel part and the backlight part together.

7. The display apparatus of claim 6, further comprising at least one hinge to couple a first side of the panel part to a first side of the backlight part.

8. The display apparatus of claim 6, wherein the display panel displays a first image through an upper surface thereof and displays a second image through a lower surface thereof.

9. The display apparatus of claim 8, wherein the second image is inverted based on the panel part being switched to the second state from the first state.

10. The display apparatus of claim 1, wherein the panel part is slidably coupled with the backlight part.

11. The display apparatus of claim 10, further comprising a sliding coupling part disposed to couple the panel part and the backlight part.

12. The display apparatus of claim 10, further comprising an input part disposed on the backlight part.

13. The display apparatus of claim 12, wherein the input part is exposed to an exterior environment in the second state.

14. The display apparatus of claim 4, wherein the panel part is rotatably coupled with the backlight part.

15. The display apparatus of claim 14, wherein the panel part is rotatable in a direction substantially parallel to a surface of the backlight part.

16. The display apparatus of claim 1, wherein the panel part further comprises:
   a first polarizing plate disposed above an upper surface of the display panel; and
   a second polarizing plate disposed below a lower surface of the display panel,
   wherein the first polarizing plate and the second polarizing plate are configured such that a transmission axis of the first polarizing plate is substantially different from a transmission axis of the second polarizing plate.

17. The display apparatus of claim 16, wherein the first polarizing plate and the second polarizing plate are substantially transparent.

18. The display apparatus of claim 1, wherein the display panel comprises:
   a first substrate;
   a second substrate facing the first substrate; and
   a liquid crystal layer disposed between the first substrate and the second substrate.

19. The display apparatus of claim 1, wherein the backlight unit comprises:
   at least one light source configured to emit light;
   an optical sheet configured to controls an optical path of the emitted light; and
   a light guide plate configured to guide the light to the display panel.

20. A display apparatus, comprising:
   a controller configured to generate a light control signal comprising an on-signal and an off-signal;
   a light source configured to emit light in response to the light control signal;
   a panel part comprising a display panel configured to display an image; and
   a coupler configured to couple the light source and the display panel together,
   wherein:
      the panel part has a first coupling state and a second coupling state,
      the controller transmits the on-signal to the light source in response to a determination that the panel part is in the first coupling state, and transmits the off-signal to the light source in response to a determination that the panel part is in the second state, and
      the display panel displays a first image based on light received from the light source in the first coupling state, and displays a second image based on the received external light in the second coupling state.

21. The display apparatus of claim 20, wherein at least a portion of the display panel is transparent or semi-transparent.

22. The display apparatus of claim 21, wherein in the second state, the display panel is transparent or semi-transparent.

* * * * *